P. S. LARSON.
LEAF SPRING FOR VEHICLES.
APPLICATION FILED DEC. 6, 1916.
1,235,703.
Patented Aug. 7, 1917.
2 SHEETS—SHEET 1.
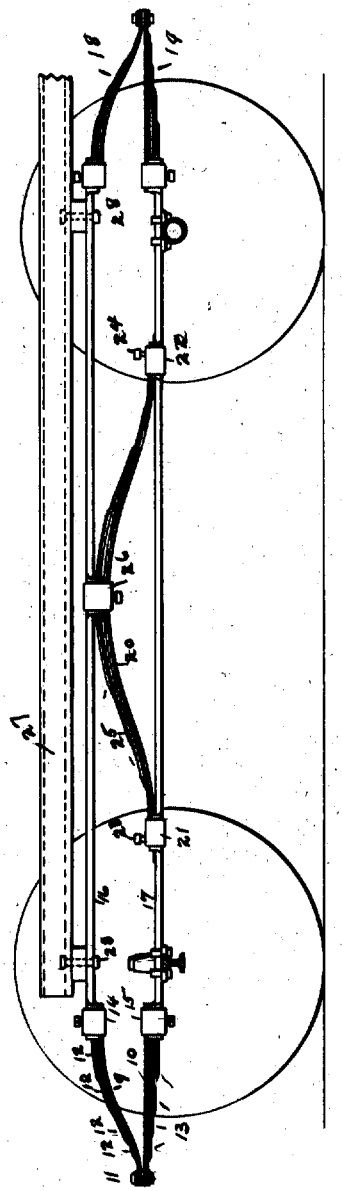
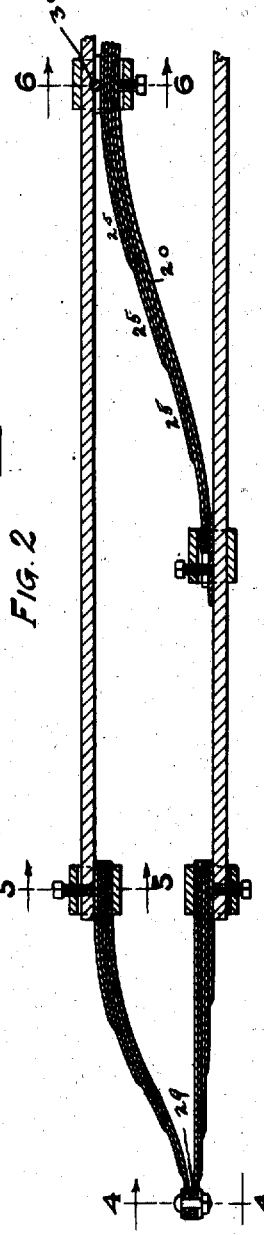
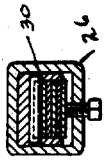
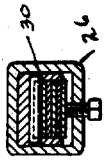
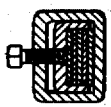
INVENTOR
Peter S. Larson
BY
G. Wright Arnold
ATTORNEY

UNITED STATES PATENT OFFICE.

PETER S. LARSON, OF OLYMPIA, WASHINGTON.

LEAF-SPRING FOR VEHICLES.

1,235,703.  Specification of Letters Patent.  Patented Aug. 7, 1917.

Application filed December 6, 1916. Serial No. 135,285.

*To all whom it may concern:*

Be it known that I, PETER S. LARSON, a citizen of the United States, residing at Olympia, in the county of Thurston and State of Washington, have invented a certain new and useful Improvement in Leaf-Springs for Vehicles, of which the following is a specification.

My invention relates to improvements in leaf springs for vehicles, and the object of my invention is to provide a spring, any one of the leaves of which can be easily replaced if broken, and which spring shall be adapted to bear the load to its destination irrespective of a broken leaf. Further my object is to provide a spring which shall distribute the force of jars throughout the length of a spring frame associated therewith and to provide a spring so disposed that the engine drive shafts are relieved of their usual strain incident to sudden jars.

Figure 7:
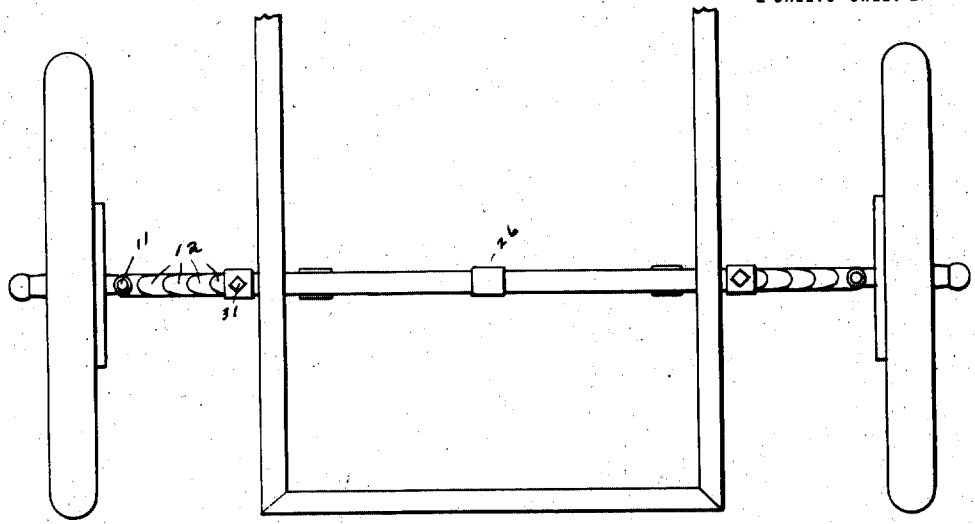
Figure 8:
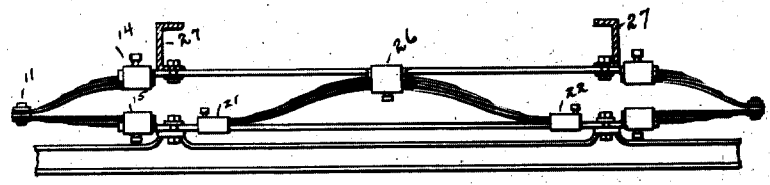

I accomplish these objects by devices illustrated in the accompanying drawings wherein Figure 1 is a side elevation of one form of a vehicle spring embodying my invention; Fig. 2 is an enlarged fragmentary plan view of the same; Fig. 3 is an enlarged fragmentary view of the same in side elevation; Fig. 4 is an enlarged view of a detail of the same in cross section on broken line 4, 4; Figs. 5 and 6 are enlarged views of other details of the same in cross section on broken lines 5, 5 and 6, 6 respectively; Fig. 7 is a plan view of my invention applied crosswise of the vehicle; Fig. 8 is a view in front elevation of the structure shown in Fig. 7.

Referring to the drawings, throughout which like reference numerals designate like parts, main metal leaves 9 and 10 of the front end of a vehicle are secured together at their outer ends by a bolt or rivet 11 and the inner ends of said leaves together with the ends of reinforcing leaves 12 and 13 are secured by clamps 14 and 15 respectively to the ends of bars 16 and 17 respectively, which constitute a frame for the spring members of my invention. The rear end parts 18 and 19 of my invention are in construction similar to the corresponding parts of the front end. Intermediate of front and rear end is disposed a main spring 20. The main spring 20, is slotted on its end, and secured by clamps 21 and 22 which are held securely fixed to the bar 17 by bolts 23 and 24 which bolts extend through said slotted ends to the bar 17. Further, the main spring 20 and the reinforcing leaves 25, are secured to the bar 16 by a clamp 26. The spring frame is secured to the chassis 27 by the bolts 28.

The bolt 11 clamps the main leaves 9 and 10 upon a wedge shaped block 29, said block thus lessening the strain on the ends of said leaves. The reinforcing leaves 25 have a main point of bearing by inserting the pin 30 in a transverse groove in the bar 16 so that a part of the pin is above the surface of the bar 16. In the modified plan of applying my invention as shown in Figs. 7 and 8, the spring frame is identical in form of construction with the spring frame of Figs. 1 to 6 inclusive.

The operation of my invention may be described as follows: Applied lengthwise of the vehicle body, it is manifest that slight jars due to the unevenness of the ground will be taken up by the end spring, since the axle bearing is in close proximity to the same, but any considerable shock will cause the intermediate spring to be depressed, such depression being possible owing to the fact that the ends of said intermediate spring are slotted. The intermediate spring takes the thrust of the load by reason of its position and operates as a fulcrum whereby a shock is communicated in a rolling manner to the rear. The length of the spring base provides a long armed leverage system, whereby a high degree of sensitiveness is attained which affords an easy riding spring.

If one of the leaves 12, 13 or 25 becomes broken it can manifestly be readily replaced by simply loosening the bolt of its respective clamp. If a main leaf, such as 9 or 10, becomes broken, it would only be necessary to secure to the ends a clamp carried for such emergency so that the said ends may be bound together,—the clamp being of any common form. If the main leaf 20 should become broken, the other leaves and the end springs would carry the load to its destination.

While I have shown only one intermediate spring it is obvious a plurality of shorter springs of like construction can be used between the bars 16 and 17. The chassis itself may be the bar 16. Much spring trouble is due to the breaking of pins and hangers and their absence in the construction shown removes danger from this cause. However, the common pin and hanger construction could be used in the place of the bolt 11. The device herein described is my preferred form and clearly modifications can be made without departing from the principle of my invention.

I claim:

1. A vehicle spring embodying two parallel bars secured together at their ends by a quarter elliptical leaf spring and a straight leaf spring, both of said springs being removably clamped to said bars, and a semi-elliptical leaf spring operatively disposed in alinement between said bars, one of said bars being adapted to be fastened to the chassis of a vehicle and the other of said bars being adapted to be fastened to the axles of a vehicle.

2. A vehicle spring embodying two parallel bars secured together at their ends by a quarter elliptical leaf spring and a straight leaf spring, both being removably clamped to said bars, and a semi-elliptical leaf spring operatively disposed in alinement between said bars at a point intermediate of the ends of said bars, the center of said semi-elliptical leaf spring being removably clamped in a fixed position to one of said bars and the ends of said spring being slidably connected to the other of said bars.

3. A vehicle spring embodying two parallel bars associated with two pairs of end springs and a semi-elliptical leaf spring, said end springs being composed of leaf springs removably clamped to the end of said bars, and the semi-elliptical leaf spring being removably clamped at a point midway of its length in a fixed position to one of said bars, and with its ends in slidable engagement with the other of said bars, any one of the leaves of said springs being separably removable.

4. A vehicle spring embodying two parallel bars secured together at their ends by a quarter elliptical leaf spring and a straight leaf spring, both of said springs being removably clamped to said bars and adapted to receive the shocks arising from the wheels, and a stiff spring operatively disposed at a point midway between the ends of said bars adapted to carry the load of the vehicle, all the leaves of said springs being separately replaceable.

In witness whereof, I hereunto subscribed my name this 27th day of November, A. D. 1916.

PETER S. LARSON.